United States Patent [19]

Lehmann et al.

[11] 4,275,924
[45] Jun. 30, 1981

[54] HINGE MOUNT HAVING A WOBBLE GEAR ADJUSTER FOR A TILTABLE SEAT BACK OF A MOTOR VEHICLE SEAT

[75] Inventors: Gerhard Lehmann; Erhard Hummel, both of Remscheid, Fed. Rep. of Germany

[73] Assignee: Keiper Automobiltechnik GmbH & Co. KG, Remscheid, Fed. Rep. of Germany

[21] Appl. No.: 64,393

[22] Filed: Aug. 6, 1979

[30] Foreign Application Priority Data

Aug. 7, 1978 [DE] Fed. Rep. of Germany ....... 2834492

[51] Int. Cl.³ .................. A47C 1/025; B21D 53/28
[52] U.S. Cl. .................................. 297/362; 29/159.2
[58] Field of Search ............. 297/362, 355, 366, 367, 297/373; 29/159.2; 16/143

[56] References Cited

U.S. PATENT DOCUMENTS

| | | | |
|---|---|---|---|
| 2,713,277 | 7/1955 | Kaul | 29/159.2 X |
| 3,731,516 | 5/1973 | Dohmann et al. | 29/159.2 X |
| 3,887,978 | 6/1975 | Dohmann | 29/159.2 |
| 3,976,327 | 8/1976 | Wirtz et al. | 297/366 |
| 4,020,717 | 5/1977 | Johnson | 297/362 X |

FOREIGN PATENT DOCUMENTS

| | | | |
|---|---|---|---|
| 2807516 | 8/1979 | Fed. Rep. of Germany | 29/159.2 |
| 1197399 | 7/1970 | United Kingdom | 29/159.2 |

Primary Examiner—William E. Lyddane
Attorney, Agent, or Firm—Michael J. Striker

[57] ABSTRACT

The hinge mount for a motor vehicle seat having a reclinable seat back comprising a wobble gear assembly which includes an internal gear and a spur gear formed integrally with the assigned hinge member by impressing a wall portion of the hinge member to such a depth that the inner surface of the impressed portion is flush with an outer surface of the hinge member and simultaneously with the precision stamping of the external or internal teeth of respective gears there are formed wall bridges in the interstices between the teeth by a continuous cold pressing process.

4 Claims, 11 Drawing Figures

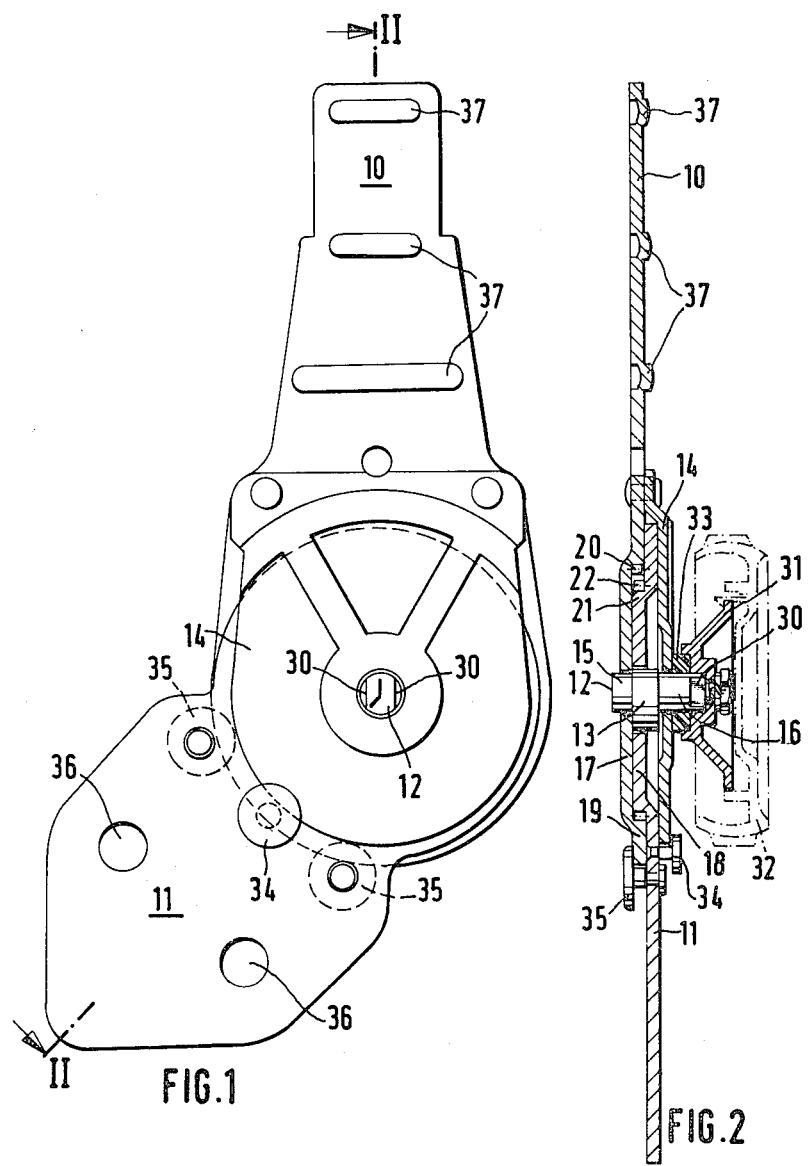

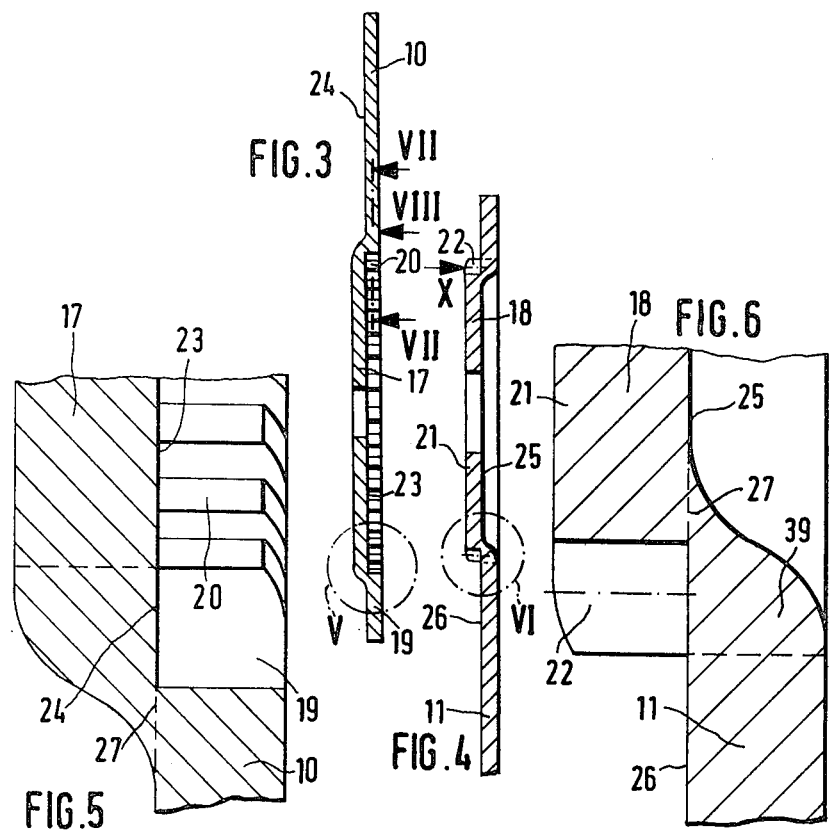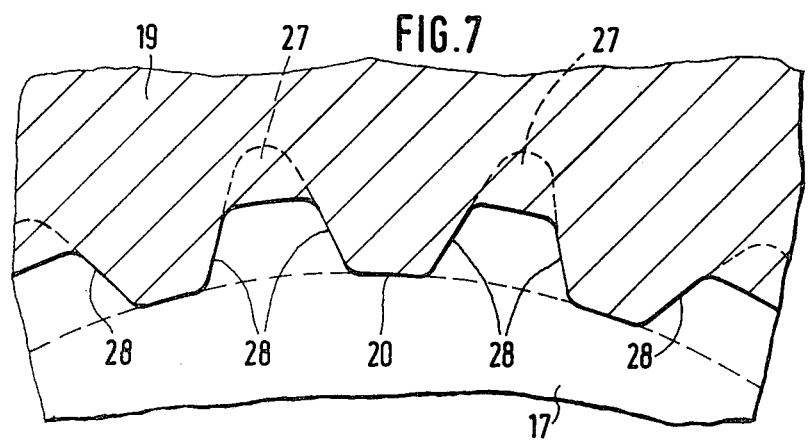

HINGE MOUNT HAVING A WOBBLE GEAR ADJUSTER FOR A TILTABLE SEAT BACK OF A MOTOR VEHICLE SEAT

BACKGROUND OF THE INVENTION

This invention relates to a hinge mount for seats having an adjustable seat back, particularly for motor vehicle seats, in which a stationary hinge member assigned to the seat proper and a tiltable hinge member assigned to the seat back are coupled one to another by means of a rotary axle whereby a wobble gear assembly for adjusting the angular position of the two hinge members is constituted of a spur gear integrally formed on one of the hinge members and of an internal gear integrally formed on the other hinge member, the spur gear being of smaller diameter than the inner diameter of the internal gear to engage the latter at one point. A rotary axle having a concentric portion supported for rotation at the center of one gear and an eccentric portion supported for rotation at the center of the other gear controls the engagement and disengagement of the two gears during the position adjustment of the seat back. Both the internal gear and the spur gear are impressed in the wall of the assigned hinge member and are connected thereby by wall bridges.

In a known hinge mount of the above-described type the impressed portions of the hinge members forming the gears project above the corresponding surface of the hinge member only to such an extent that the wall of the impressed gear partially overlaps the thickness of the wall of the assigned hinge member whereby in the range of the formation between the hinge member and its impressed portion forms the bridge wall connecting the peripheral region of the impressed gear to the hinge member. In such prior-art hinge mounts, however, the inner surface of the impressed portion is not in alignment with the outer surface of the hinge member. It is true that the impressed gear and the remaining hinge member have the same wall thickness which for the sake of strength is determined by the desired width of teeth of the gears and the necessary strength of the wall bridge remaining between the inner teeth in the wall of the hinge member and the external teeth in the wall of the corresponding impressed portion. By means of a finishing stamping process it is possible to produce on the hinge members both external teeth and depending on the finishing stamping process also internal teeth corresponding in size and in number to one another. In the wobble gear assembly, however, each hinge member uses either the internal teeth or the external teeth only whereas the other teeth which result from the employed manufacturing process remain unused. Due to the existence of the overlapping wall portion between the two gears on each hinge member the thickness of the wall of the latter results larger than it would be necessary for the transmission of the supporting forces.

SUMMARY OF THE INVENTION

It is, therefore, a general object of the present invention to overcome the aforementioned disadvantages.

More particularly, it is an object of the invention to provide an improved hinge mount of the aforedescribed type in which the thickness of the wall of each hinge member and of gears impressed thereon can be reduced to the size only which is required for the width of the teeth of the gears.

In keeping with this objects and others which will become apparent hereafter, one feature of the invention resides, in a hinge mount having adjustable wobble gear assembly of the above-described type, in a combination which comprises the impression of a corresponding gear on the assigned hinge member to such a depth that the inner surface of the impression is flush with the surrounding surface of the hinge member and a plurality of wall bridges connecting the impressed gear to the hinge member are formed in the interstices between the teeth of the gear.

In this manner the hinge members can be manufactured of a substantially thinner sheet metal and savings on materials amounting to approximately 30% are achieved and consequently the production of the hinge mount is substantially economized. This material savings results from the fact that in conventional solutions of the hinge mounts the wall bridge between the impressed inner gear and the expressed spur gear has to amount to about 30% of the total width of the hinge member or of its impressed portion. By the solution according to this invention it is now possible to employ the thickness of the sheet material for the hinge members which is exclusively determined by the width of the teeth of the gear which is required for the necessary strength of the support.

In order to insure a reliable connection between the hinge member and the interior gear of the spur gear integrally shaped thereof by stamping, the wall bridges occurring in the interstices of teeth of the impressed gears of this invention overlap in the range of the base of the teeth the root circle of the spur gear or the ground circle of the interior gear approximately about one-quarter of the height of the teeth. In the range of the flanks of the teeth the wall bridges are with preference made in the form of rounded transmissions between the flanks of the inner teeth and the inner surface of the impressed portions or between the flanks of the outer teeth and the corresponding upper surface of the assigned hinge member.

According to another feature of this invention, an economic method of manufacturing of impressed gears according to this invention in the flat walls of the assigned hinge members resides in the use of a finishing stamping process for shaping the teeth of the gears and the wall bridges between the impressed portion forming the gear and the hinge member is made simultaneously in a continuous cold pressing or stamping process. By virtue of the combination of the final stamping with a continuous cold pressing, it is possible to reduce the impression on a hinge member without any preliminary treatment and, at the same time, to shape on the impressed portion the gear teeth in a single working cycle whereby by the continuous pressing process, the wall bridges are formed in respective interstices or gaps in the rim area between the teeth of the gears, the wall bridges being directed rearwardly so that they do not occupy any functional space.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of an adjustable hinge mount for reclinable seat backs;

FIG. 2 is a sectional front view of the hinge mount of FIG. 1 taken along the line II—II;

FIG. 3 is a sectional front view of a hinge member provided with an impressed internal gear connectable to the seat back;

FIG. 4 is a sectional front view of a hinge member having an impressed portion provided with an embossed spur gear connectable to the seat proper;

FIG. 5 is a sectional front view of a cut-away portion V of FIG. 3, shown on an enlarged scale;

FIG. 6 is a sectional front view of a cut-away portion VI of the hinge member of FIG. 4, shown on an enlarged scale;

FIG. 7 is a sectional side view of a cut-away portion of the impressed internal gear of FIG. 3 taken along the line VII—VII and shown on an enlarged scale;

DESCRIPTION OF THE PREFERRED EMBODIMENTS

Figure 8:
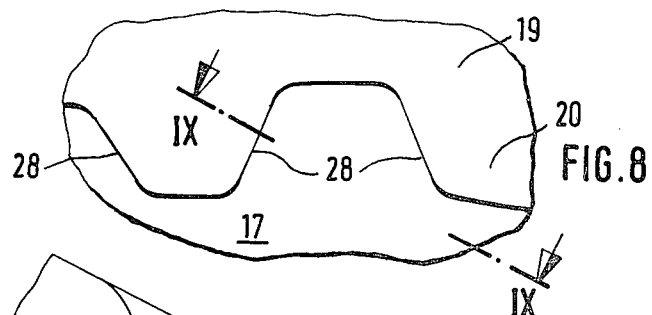
FIG. 8 is a side view of a cut-away portion of the internal gear of FIG. 3, shown on an enlarged scale in the direction of arrow VIII.

Referring firstly to FIGS. 1 and 2 the illustrated adjustable hinge mount is designed for use in connection with a vehicle seat having a reclinable backrest. The hinge mount includes a hinge member 10 connectable to a lateral side of the reclinable seat back and a hinge member 11 connectable to a lateral side of the seat proper. The two hinge members 10 and 11 are adjustably interconnected by means of a wobble gear assembly including a rotary axle 12 defining an eccentric section 13 and concentric sections 15 and 16, an internal gear 19 integrally formed on the hinge member 10 and a spur gear 21 integrally formed on the hinge member 11. The spur gear 21 is smaller in diameter than the internal gear 19 and is supported on the eccentric portion 13 of the axle 12 whereas the internal gear 19 is supported on the concentric portion 15 of the axle. The hinge member 10 which is normally connected to the reclinable seat back is preferably connected by riveting, for example, to a reinforcing plate 14 which is also supported for rotation on the other concentric portion 16 of the axle 12 to rotate together with the hinge member 10. Each of the two hinge members 10 and 11 is formed with a recession or impressed portions 17 or 18. The impressed portion 17 of the hinge member 10 is formed with inner teeth 20 constituting the internal gear 19, whereas the recessed portion 18 has embossed on its outer periphery the external teeth 22 forming the external gear 21.

According to this invention, the impressed portions 17 and 18 are arranged relative to the assigned hinge members 10 and 11 in such a manner that the inner surfaces of the former are levelled with the outer surfaces of the latter. In other words, the inner surface 23 of impressed portion 17 of hinge member 10 is on the same level with the outer surface 24 of the hinge member 10. Similarly, the inner surface 25 of the impressed portion 18 of the hinge member 11 is on the same level with the outer surface 26 of the hinge member 11.

Figure 9:
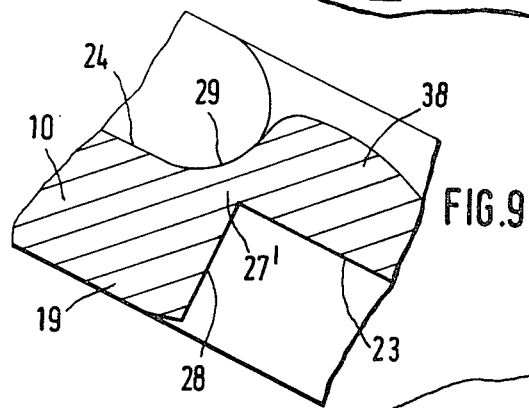
FIG. 9 is a sectional top view of the impressed internal gear portion of FIG. 8 taken along the line IX—IX.
Figure 10:
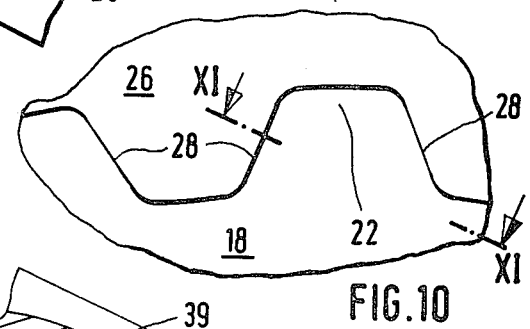
FIG. 10 is a side view of an enlarged cut-away portion of the spur gear of FIG. 4 as seen in the direction of arrow X.
Figure 11:
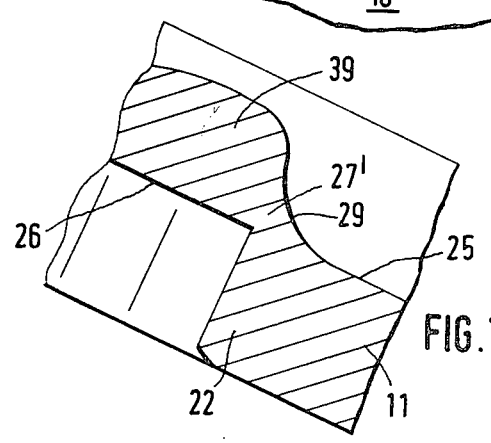
FIG. 11 is a sectional top view of the cut-away portion of the embossed spur gear of FIG. 10 taken along the line XI—XI.

As seen from FIGS. 3–7, 9 and 10, wall portions 27 and 27' connect the recessed portions 17 and 18 to respective hinge members 10 or 11. The wall bridge 27 in the range of the base of each tooth connects the recessed portions 17 or 18 to the hinge members 10 or 11. The wall bridges 27' on the hinge member 10 take place between the wall portion 28 pressed out in the range of interstices between the internal teeth 20 and the outer surface 24 of the hinge member. The wall bridges 27' on the hinge member 11 are formed by rounded transitions 29 between the wall portion 39 pressed out in the range of interstices between the outer teeth 22 and the inner surface 25 of the impressed portion 18.

The spur gear 21 embossed on the impressed portion 18 has its crown circle shorter at least about the size of one tooth than the root circle of the internal gear 19, the inner toothing 20 of which extends on the inner periphery of the impressed portion 17. Accordingly, the number of teeth in the internal gear 19 and the spur gear 21 differ from one another at least about one tooth so that during the rotation of the rotary axle 12 a relative movement between the internal gear 19 and the spur gear 21 and consequently between the hinge member 10 and hinge member 11, takes place. In the course of this relative movement, the eccentric portion 13 of rotary axle 12 keeps the spur gear 21 always in a partial engagement with the internal gear 19 which rotates about the concentric portions 15 and 16 of the axle 12.

The free end of the concentric portion 16 of axle 12 is provided with two opposite flat surfaces 30 for engaging a corresponding recess in a carrier disk 31 to which is attached a hand wheel 32 indicated by dash-and-dot lines in FIG. 2. An elastic ring 33 is inserted between the reinforcing plate 14 and the carrier disk 31 to take over the locking function when the backrest is unloaded and when vibrations occur. To insure the unity between the hinge members 10 and 11 there are provided set bolts 34 and 35 secured to respective hinge members 10 and 11 by riveting and having their heads in contact with the marginal parts of the reinforcing plate 14 and the internal gear 19. Mounting holes 36 serve for securing the hinge members 10 and 11 to the seat back and the seat proper by bolts or there are provided bulging corregations for the attachment by welding.

The method of manufacturing the impressed portions in respective hinge members and providing the impressions with external and internal teeth includes preferably a precision stamping process combined with the continuous cold pressing process for shaping the teeth. By using this combination of the precision stamping simultaneously with a cold pressing, it is possible to produce in a single working cycle either an impression having on its outer surface the external teeth to form the spur gear or an impressed portion having teeth on its inner periphery to form the internal gear.

It will be understood that each of the elements described above, or two or more together, may also find a useful application in other types of constructions, differing from the types described above.

While the invention has been illustrated and described as embodied in a hinge mount, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an adjustable hinge mount for use in connection with a seat having a reclinable seat back, particularly a motor vehicle seat, including a first hinge member fixed to the seat and a second hinge member fixed to the seat back, a combination comprising a wobble gear assembly including an internal gear formed in the wall of one of said hinge members; a spur gear formed in the wall of the other hinge member, the diameter of said internal gear being larger than the diameter of said spur gear to mesh with the latter at one point only; a rotary axle interconnecting said hinge members and having a concentric portion supported for rotation at the center of said one gear and an eccentric portion supported for rotation at the center of said other gear to adjust the angular position of said hinge members when said axle is rotated, each of said gears being impressed in the wall of the associated hinge member to such a depth that the inner surface of the impressed portion is flush with a major surface of said hinge member; and wall bridges connecting each impressed portion to said major surface of its associated hinge member and formed respectively in the interstices between the teeth of said gear.

2. The combination as defined in claim 1, wherein said wall bridges overlap the root circle of said spur gear and the crown circle of said internal gear approximately about one-fourth of the height of the teeth.

3. The combination as defined in claim 1, wherein said wall bridges are connected to the flanks of respective teeth and to the corresponding major surface of said hinge member and to the inner surface of said impressed portion by rounded transition portions.

4. A method of manufacturing spur gears and internal gears integrally formed in a flat wall of respective hinge members of the hinge mount according to claim 1, comprising the steps of impressing said gears in said wall by a precision stamping process and simultaneously shaping the wall bridges in the gaps between respective teeth of the gear by a continuous cold pressing process.

* * * * *